No. 872,800. PATENTED DEC. 3, 1907.
F. H. CROCKARD.
OPEN HEARTH STEEL PLANT.
APPLICATION FILED NOV. 10, 1906.
7 SHEETS—SHEET 1.
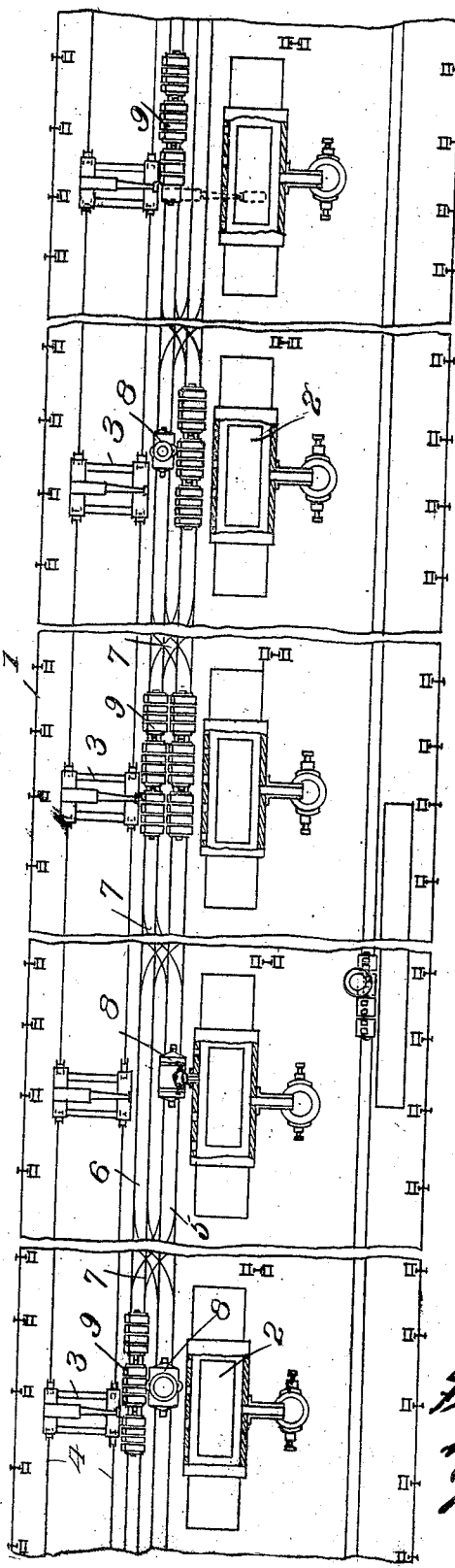

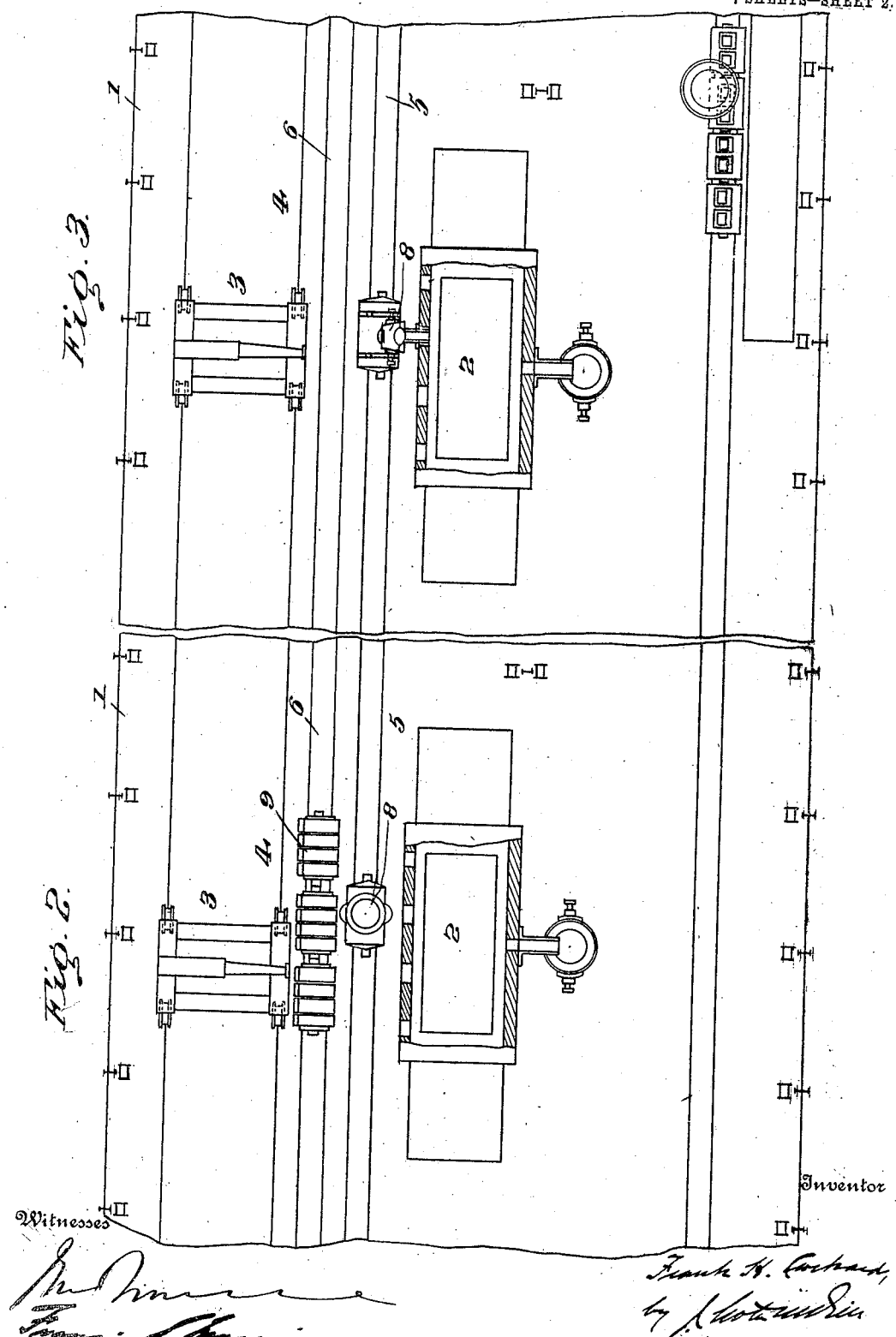

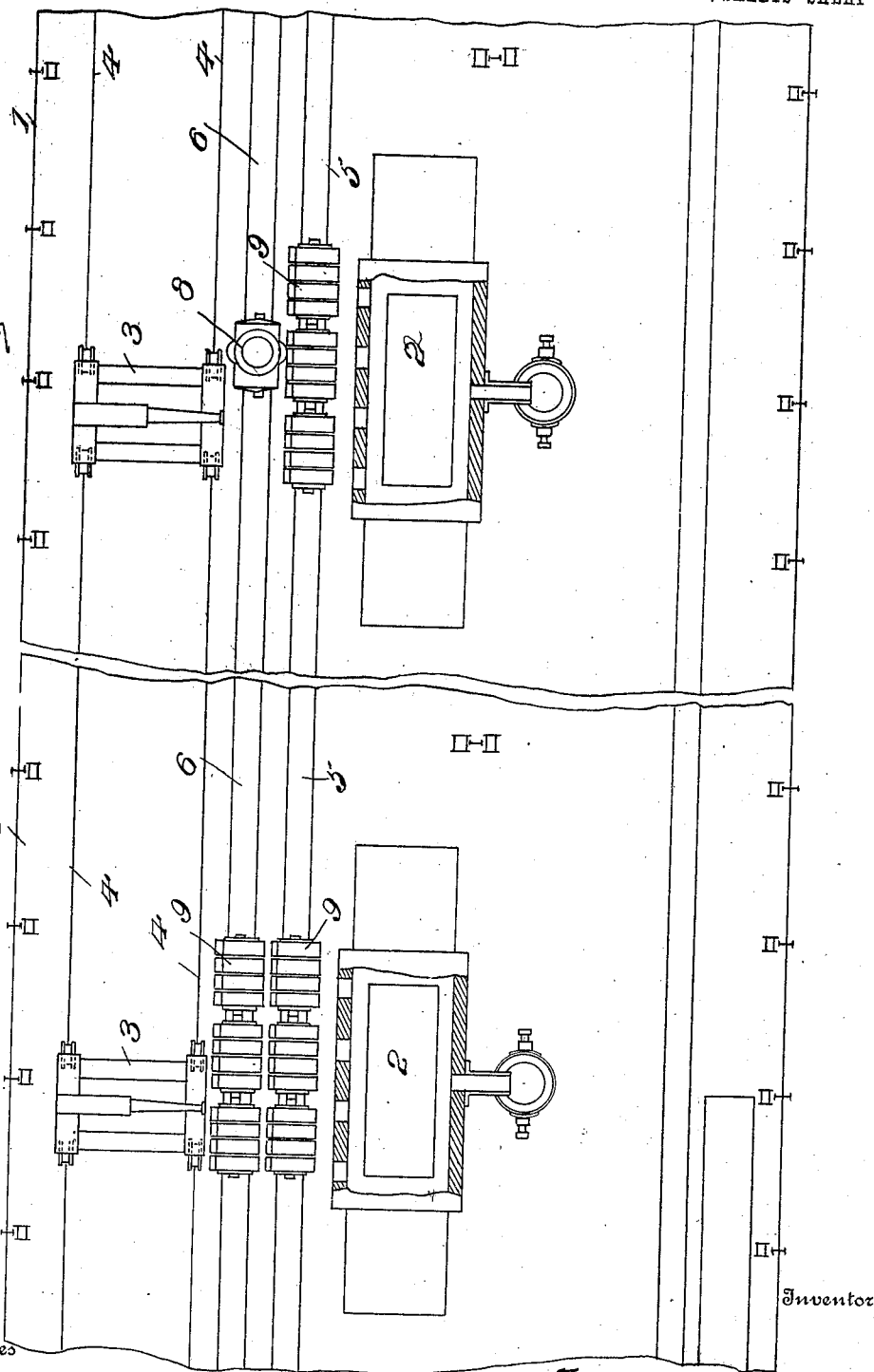

No. 872,800. PATENTED DEC. 3, 1907.
F. H. CROCKARD.
OPEN HEARTH STEEL PLANT.
APPLICATION FILED NOV. 10, 1906.
7 SHEETS—SHEET 4.
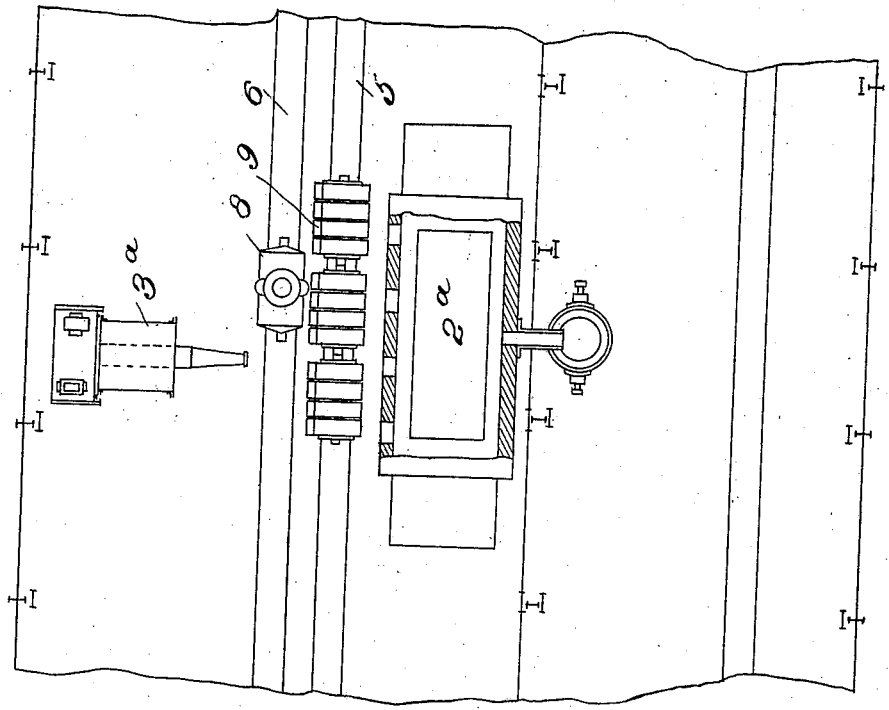
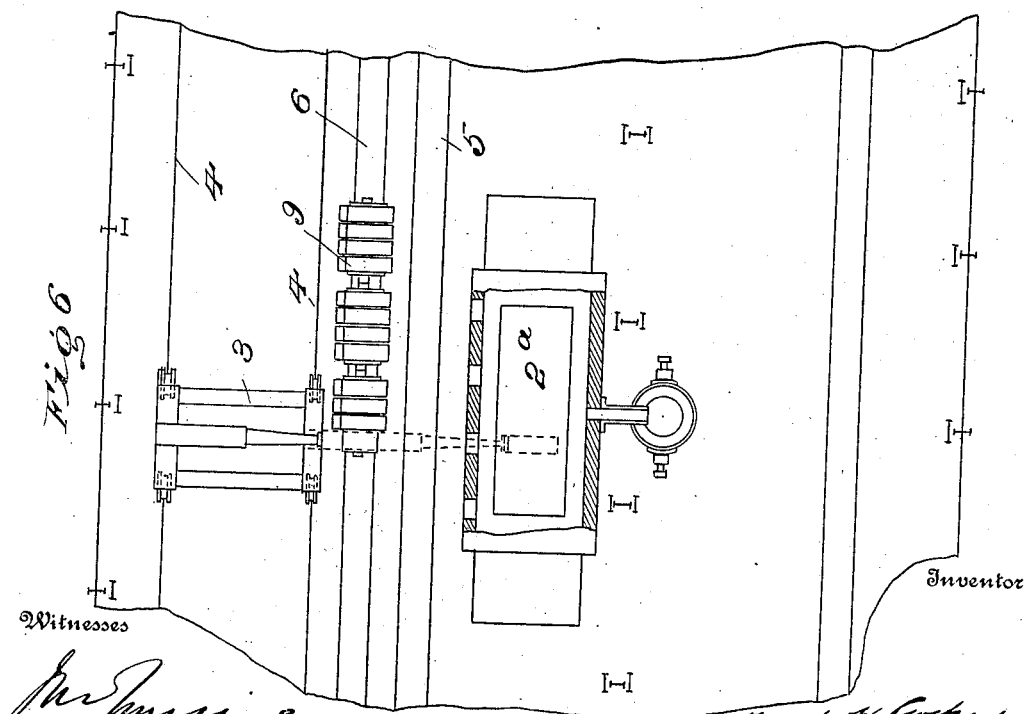
Witnesses
Inventor No. 872,800. PATENTED DEC. 3, 1907.
F. H. CROCKARD.
OPEN HEARTH STEEL PLANT.
APPLICATION FILED NOV. 10, 1906.
7 SHEETS—SHEET 5.
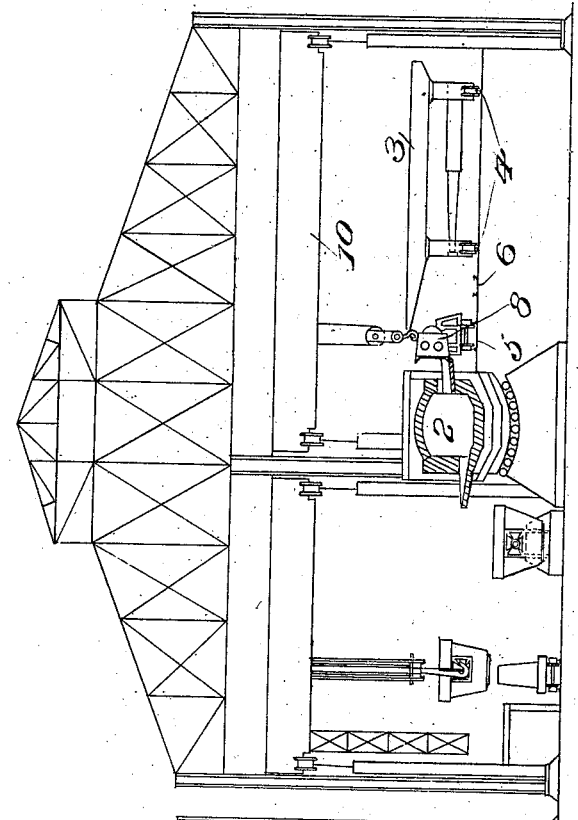
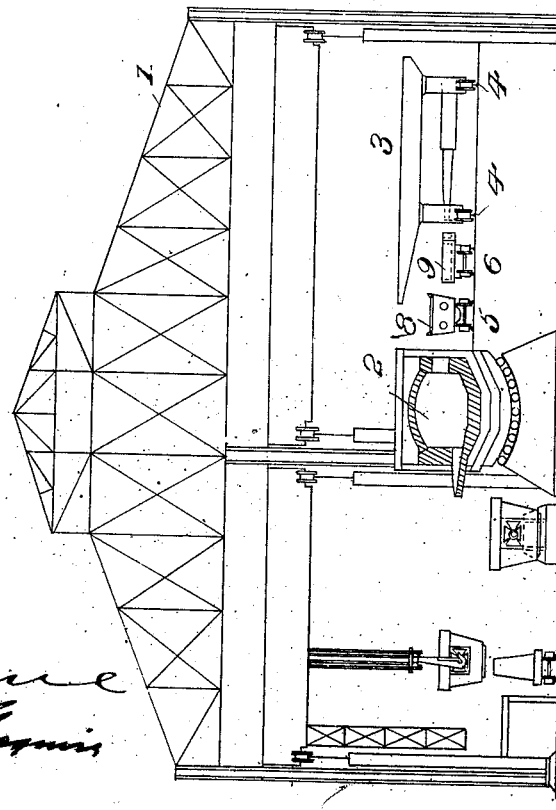
Witnesses
Inventor
Frank H. Crockard,
by
Attorney

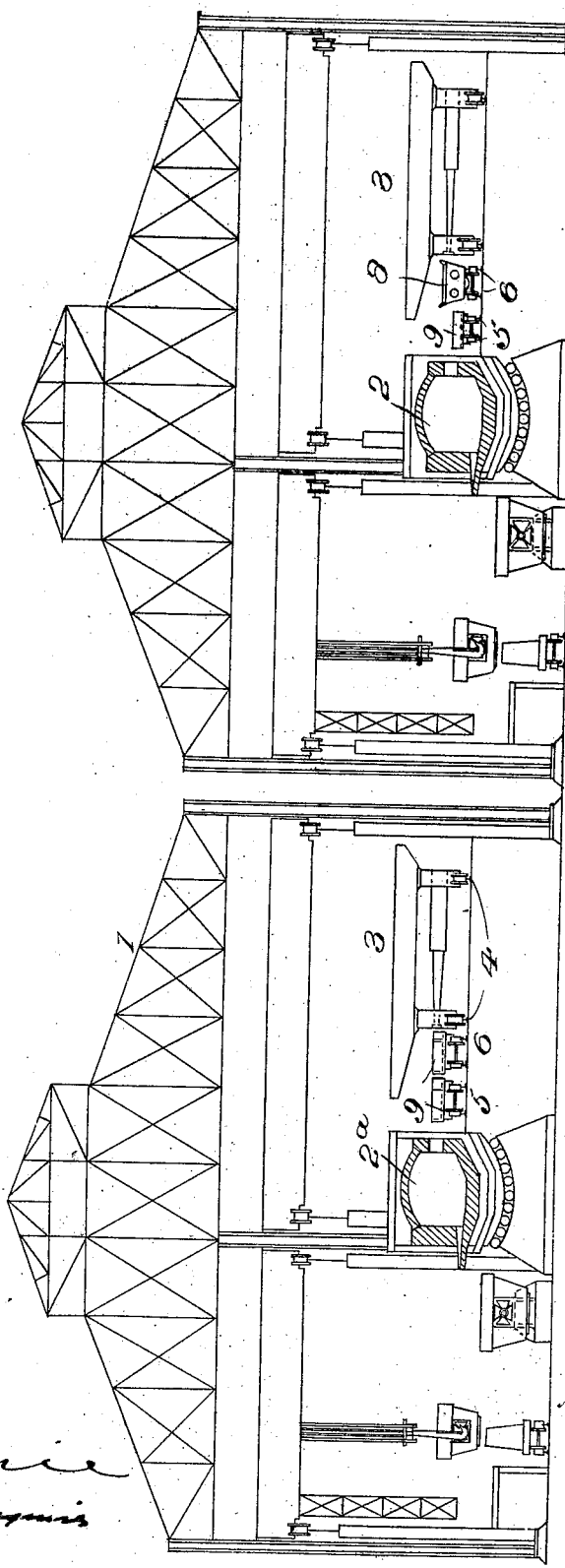

No. 872,800. PATENTED DEC. 3, 1907.
F. H. CROCKARD.
OPEN HEARTH STEEL PLANT.
APPLICATION FILED NOV. 10, 1906.
7 SHEETS—SHEET 7.
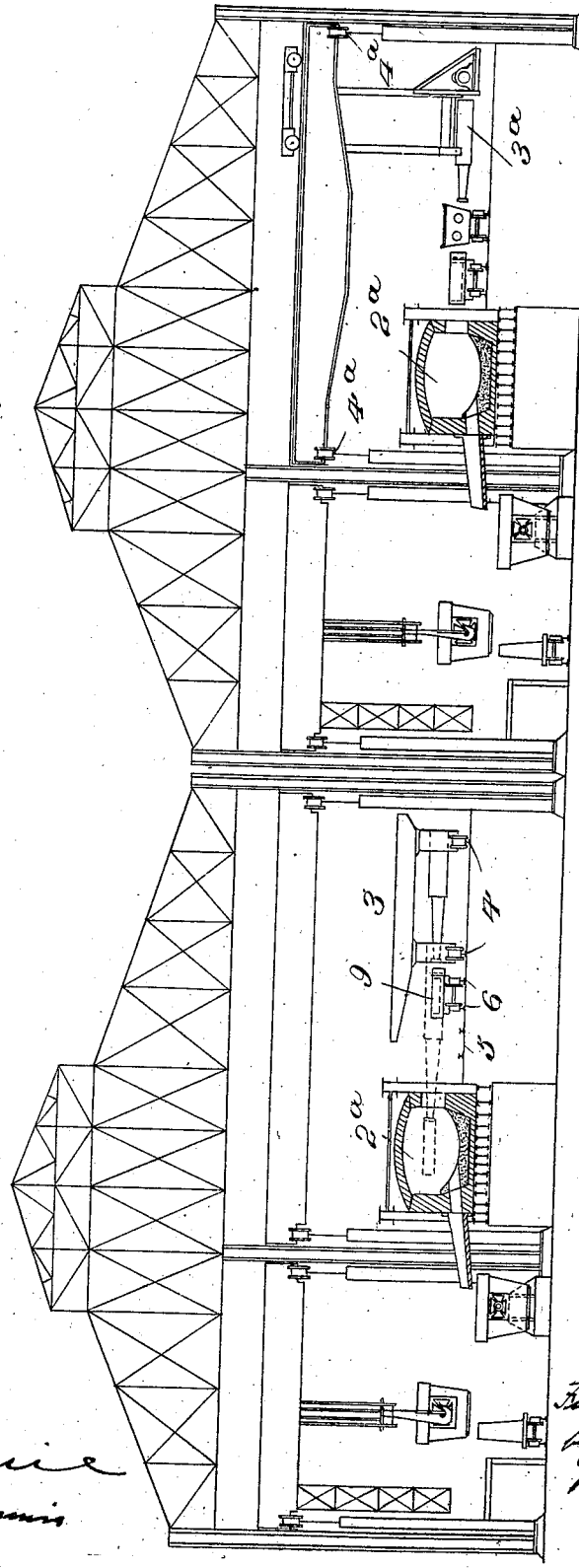

UNITED STATES PATENT OFFICE.

FRANK H. CROCKARD, OF BIRMINGHAM, ALABAMA, ASSIGNOR OF ONE-HALF TO ALEXANDER LAUGHLIN, OF SEWICKLEY, PENNSYLVANIA.

OPEN-HEARTH STEEL PLANT.

No. 872,800.        Specification of Letters Patent.        Patented Dec. 3, 1907.

Application filed November 10, 1906. Serial No. 342,860.

*To all whom it may concern:*

Be it known that I, FRANK H. CROCKARD, of Birmingham, in the county of Jefferson and State of Alabama, have invented certain new and useful Improvements in Open-Hearth Steel Plants; and I do hereby declare the following to be a full, clear, and exact description of the invention, such as will enable others skilled in the art to which it appertains to make and use the same.

Heretofore great difficulty has been occasioned in maintaining a proper supply of material to all the open hearth furnaces in a steel plant where more than four or five furnaces are used. As the most economically operated steel plants contain from eight to fourteen furnaces, usually located in a straight line, it has always been a very serious problem to have stock ready for charging in each furnace at the time required, resulting frequently in loss of time, and consequent loss of tonnage.

Before my present invention, one track for material-bearing cars has been located between the charging machine and the line of open hearth furnaces, and in order to provide additional track-facilities, some plants have been equipped with an additional track located between the rear of the charging machine and the outside of the steel plant building, and, in some instances, an additional track, for receiving stock, has been located just outside of the building. While such additional tracks are of some service, they are objectionable because of the fact that every time material is brought in on the tracks in rear of the charging machine, it is necessary to use a long switch, or cross-over, before the material can be positioned on the track in front of the charging machine ready for charging into a furnace, and while the material is being switched it interferes with the operation of the charging machine, as the switches have to cross the tracks upon which the charging machine travels from one end of the building to the other, when the tracks are all on the same level, as is usually the case.

In a large number of open-hearth steel plants, it is now the practice to charge into the furnaces molten pig iron which is conveyed in ladles brought on cars to the end of the building, the ladles being there picked up by an overhead traveling crane and carried to the furnace into which the hot pig iron is to be charged. The practice of handling hot pig iron with an overhead crane is objectionable, first, because the travel of the crane is, necessarily, very slow, and, secondly, time is lost by the workmen on the charging floor, who will not remain at work while the ladle of hot pig iron is being transported over their heads.

In some steel plants, where the overhead crane is not used, the ladle of hot pig iron has to be brought in on the same track that is used for the charging box cars. In such instances, it is necessary to maintain, free of cars, the single track between the charging machine and the line of furnaces, and this single track has to remain clear of cars until the pig iron has been poured into the furnace, and the iron ladle is again passed along such track and out of the plant. It is then necessary to bring in charging box cars loaded with scrap and other materials to be charged into the furnace, and considerable loss of time is experienced in getting these charging box cars into position.

The object of my present improvement is to overcome all these difficulties, and to provide means for facilitating the handling of all the charging box cars that may be necessary to maintain a uniform supply of material for a series of open-hearth furnaces.

A further object is to provide for the positioning of all cars, whether charging box cars or ladle cars, between the line of furnaces and the charging machine or machines, so as to avoid the danger of delay consequent upon transferring cars from a track, or tracks, located in rear of the charging machine, to a single track between the charging machine and the line of furnaces.

A further object is to enable charging cars, whether charging box cars or ladle cars, to be so positioned relative to a line of open-hearth furnaces, that the charging machine may deliver the contents of the charging boxes the very instant that the hot pig iron has been poured into the furnaces. And further objects are to provide a clear track at practically all times between the charging machine and the line of open-hearth furnaces which track may be used for the passage of a train of cars, whether charging box cars or ladle cars, the passage of which will cause only a momentary cessation in the charging of any furnace being charged at the time, and to enable the more rapid delivery of hot metal from a storage reservoir, or other source, to the several furnaces.

The invention will be hereinafter fully set forth and particularly pointed out in the claims.

In the accompanying drawings, Figure 1 is a diagrammatic view, with parts broken away, of an open-hearth steel plant constructed in accordance with my invention. Figs. 2, 3, 4, 5, 6 and 7 are plan views, on an enlarged scale, of the different furnaces and tracks constituting the plant, the furnaces in Figs. 6 and 7 being of the stationary type, while those in the other figures are designed to "tilt". Figs. 8, 9, 10, 11, 12 and 13 are, respectively, elevations of the furnaces, tracks and charging machines, shown in Figs. 2 to 7, inclusive. In Figs. 2 to 13, inclusive, a charging machine is shown for each furnace, although ordinarily one charging machine is sufficient for all the furnaces.

Referring to the drawings, 1 designates an open-hearth furnace building wherein is located a series of open-hearth furnaces 2. I have indicated five furnaces, but it is manifest that any desired number may be employed. 3 designates the charging machine, one being provided for the several furnaces, although two or more may be used, if desired. It is mounted on a wide track 4, paralleling the several furnaces which are usually arranged in line, as shown in Fig. 1, so that it may be used to charge any given furnace, or, as shown in Figs. 7 and 13, the charging machines may be suspended and travel on tracks 4ª located above the furnaces, instead of on the charging floor.
According to my invention, I provide between the line of travel of the charging machine and the charging side of the several furnaces, two tracks, 5 and 6, paralleling track 4 and the furnaces. These two tracks, 5 and 6, are connected by suitable switches and intersecting curved rails, as shown at the points 7, so that cars on the outer track 6, may be readily switched onto the inner track 5, or vice versa.
The charging machine 3 is constructed to have a stroke sufficiently long to enable it to deliver boxes from cars on the outer track 6 into the furnaces, as well as from cars on the inner track 5.
The invention will be better understood by reference to the several figures of the drawings.

In Figs. 2 and 8, I have shown a ladle carrying car 8 in front of the furnace on track 5, with charging box cars 9, on track 6, between the ladle car and the charging machine. It will be seen that the charging box cars may be assembled ready to be manipulated by the charging machine, while the ladle car is being pushed by, or positioned, between the charging box cars and the furnace.

In Figs. 3 and 9, the ladle is shown as being tilted by an overhead crane 10, and in the act of pouring molten pig iron into the furnace, indicating that while the ladle car is being emptied, there is a clear way on the outer track for a train of charging box cars.

In Figs. 4 and 10, two trains of charging box cars 9, are located on both the inner and outer tracks 5 and 6. While the contents of one train of cars are being emptied in the furnace, another train is free to pass between the charging machine and the furnace with but a momentary cessation in the operation of charging the furnace. This is of importance, even where pig iron ladle cars are not employed; different trains of charging box cars being permitted to pass any one furnace in order to maintain a proper supply of material at all the furnaces.

In Figs. 5 and 11, the pig iron ladle, 8, is between the charging machine and a train of charging box cars 9, in front of the furnace, the ladle of molten pig iron being free to pass while the furnace is being charged, with only a momentary interruption of the charging operation, thus avoiding delay in transporting the ladle around behind the charging machine, or in lifting the ladle over the charging machine with a traveling crane.

In Figs. 6 and 12, I have shown a train of charging box cars on the outer track, 6, with the inner track, 5, free to permit of the passage of a ladle of molten pig iron, or for the passage of another train of charging box cars without the necessity of interrupting, more than momentarily, the furnace charging operation.

In Figs. 7 and 13, the charging machine 3ª is shown as suspended and traveling on tracks 4ª located overhead, above the furnace, instead of on tracks located on the charging floor. In Figs. 6, 7, 12 and 13, I have indicated the furnace 2ª as of the stationary type, and have shown the structural work of the plant accordingly, but in the other figures, I have indicated tilting furnaces with corresponding arrangement of building.

It is manifest that the invention is not confined to either style of furnace, nor is it confined to either class of charging machines, but is applicable to open-hearth steel plants generally.

From what has been said, it will be seen that by providing the described system of tracks leading from a blast furnace and other supply points, the necessary material may be readily supplied to a long line of open-hearth furnaces, and may be transported from any point within the limits of the plant, by one furnace, to any other furnace, without materially interfering with the working of the intermediate furnaces. My improvement, therefore, permits the uninterrupted supply of material to a long line of open-hearth furnaces, and saves a great deal of time which is now lost through the inability to bring in the material fast enough to supply a long line of furnaces from a single track between the furnace and the charging machine.

I claim as my invention:—

1. The combination, in an open hearth steel plant, of a series of furnaces, a charging machine movable in proximity to said furnaces, conveyers for charging boxes, conveyers for hot metal, a plurality of tracks for such conveyers located between the line of travel of said charging machine and the furnaces, and means connecting said tracks for transferring conveyers from one track to another.

2. The combination, in an open hearth steel plant, of a series of furnaces, a charging machine movable in proximity to said furnaces, conveyers for charging boxes, conveyers for hot metal, a plurality of tracks for such conveyers located between the line of travel of said charging machine and the furnaces, and switch-rail-connections between said tracks located between all of the several furnaces.

3. In an open hearth steel plant, the combination of a series of furnaces, a charging machine movable in proximity to said furnaces, charging box cars for carrying metal to said furnaces, a plurality of tracks for said cars located between said charging machine and said furnaces, and switch-rail connections between said tracks located between all of the several furnaces, said charging machine being constructed to deliver boxes from cars on either track into the furnaces.

In testimony whereof, I have signed this specification in the presence of two subscribing witnesses.

FRANK H. CROCKARD.

Witnesses:
G. H. CRAIN,
P. V. KOLB.